United States Patent [19]

Livsey et al.

[11] Patent Number: 5,032,425
[45] Date of Patent: Jul. 16, 1991

[54] TREATMENT PROCESS

[75] Inventors: Ian Livsey, Sedgefield; Rachael L. Parry, Yarm, both of England

[73] Assignee: Tioxide Group PLC, London, England

[21] Appl. No.: 462,240

[22] Filed: Jan. 9, 1990

[30] Foreign Application Priority Data

Feb. 2, 1989 [GB] United Kingdom ............... 8902293

[51] Int. Cl.$^5$ .............................................. B05D 3/12
[52] U.S. Cl. ...................................... 427/57; 427/221; 523/200; 523/205; 524/457
[58] Field of Search .................... 427/57, 215, 221; 523/200, 205; 524/457

[56] References Cited

U.S. PATENT DOCUMENTS

| 3,714,102 | 1/1973 | Reiss | 252/316 X |
|---|---|---|---|
| 4,071,225 | 1/1978 | Holl | 366/114 |
| 4,590,127 | 5/1986 | Hashimoto et al. | 427/215 |
| 4,620,987 | 11/1986 | Yamashita et al. | 427/221 |
| 4,724,161 | 2/1988 | Coutts et al. | 427/57 |

FOREIGN PATENT DOCUMENTS

| 696799 | 9/1953 | United Kingdom . |
| 864178 | 3/1961 | United Kingdom . |
| 927761 | 6/1963 | United Kingdom . |
| 1008805 | 11/1965 | United Kingdom . |
| 1340045 | 12/1973 | United Kingdom . |
| 1369468 | 10/1974 | United Kingdom . |
| 2133414A | 7/1984 | United Kingdom . |

OTHER PUBLICATIONS

Rachael Templeton-Knight, "Encapsulation of Inorganic Particles by Emulsion Polymerisation", Chemistry & Industry, Aug. 20, 1990, pp. 512-515.

Kenneth S. Suslick, "The Chemical Effects of Ultrasound", Scientific American, Feb. 1989, pp. 62-68.

John P. Lorimer and Timothy J. Mason, "Sonochemistry, Part 1-The Physical Aspects", Chem. Soc. Rev., 1987, 16, pp. 239-274.

P. Godard and J. P. Mercier, "Nouveauz developpements dan la technologie de l'encapsulation de pigments mineraux et dans la synthese de revetements protecteurs", Double Liaison-Chimie des Peintures No. 387-388, Jan.-Feb. 1988.

Masahiro Hasegawa, Kunio Arai and Shozaburo Saito, "Uniform Encapsulation of Fine Inorganic Powder with Soapless Emulsion Polymerization", Journal of Polymer Science: Part A: Polymer Chem., vol. 25, pp. 3117-3125 (1987).

*Primary Examiner*—Michael Lusignan
*Attorney, Agent, or Firm*—Banner, Birch, McKie & Beckett

[57] ABSTRACT

A process of coating or encapsulating an inorganic powder is described in which the powder, preferably a pigment, is dispersed in an aqueous medium and an ethylenically unsaturated monomer is polymerized in the presence of the powder and while subjecting the reaction mixture to ultrasonic vibrations. The monomer is present in an amount not exceeding 200% by weight of the powder and preferably is an acrylate or methacrylate.

The powder has a cationic charge on its surface which can be generated by treatment of the surface with, preferably an aluminium salt.

22 Claims, No Drawings

TREATMENT PROCESS

This invention relates to a treatment process and particularly to the treatment of an inorganic powder with an organic material.

According to the present invention a process for the treatment of an inorganic powder comprises polymerising a reaction mixture of an ethylenically unsaturated monomer in the presence of a dispersed inorganic powder having a cationic charge on the surface of the particles thereof, said monomer being present in an amount not greater than 200% of the weight of said powder, and subjecting the said monomer and said powder to the effect of ultrasonic vibrations during at least a part of the polymerisation of said monomer so that said particles are coated with polymerised monomer.

The present invention is a process for coating particles of an inorganic powder with an organic polymer. The process reduces to a minimum any free polymer produced which does not form part of a coating and seemingly the coating obtained is thicker than that obtained by a process which does not involve the use of ultrasonic vibrations. The products are well dispersed and aggregation is minimised.

Generally speaking the process involves the preparation, initially, of a dispersion, usually an aqueous dispersion, of the inorganic powder to be coated, and, if necessary, the modification of the particles thereof so that the surface thereof carries a cationic change. An ethylenically unsaturated monomer usually is then added to the dispersion of the inorganic powder and polymerisation initiated by an appropriate technique. During at least a part of the polymerisation the dispersion of the inorganic powder is subjected to ultrasonic vibrations which have the advantageous effects hereinbefore specified. In order to minimise further the production of free polymer the amount of the monomer should not exceed 200 percent by weight of the inorganic powder.

The process of the present invention can be used to coat the particles of any inorganic powder but those of more interest are the inorganic pigments, extenders and fillers. Particularly, inorganic pigments are found to be of most use in the process and such pigments are titanium dioxide pigments, aluminium oxide pigments, antimony oxides, barium pigments, calcium pigments, zirconium pigments, chromium pigments, iron pigments and magnesium pigments. Extenders and/or fillers such as silica, silicates, aluminates and particularly the clays can also be treated by the process of the invention. Mixtures of pigments and extenders can also be treated as well as non-pigmentary forms of the inorganic powders mentioned as pigments. In the most preferred process the inorganic powder is titanium dioxide pigment, preferably rutile titanium dioxide. Desirably the inorganic powder is in a finely divided state prior to coating and, if necessary, can be milled by suitable means to achieve such a state.

In the polymerisation the dispersed inorganic powder particles have a cationic charge on their surfaces. Usually the inorganic powder will require actual treatment with a suitable compound to produce such a cationic charge but in some types of powders a cationic charge can be produced by lowering the pH of an aqueous dispersion of the powder to a value below pH 7 by adding an acid. However for many of the inorganic powders actual treatment with a surface charge modifying agent is necessary.

Typically a dispersion of the inorganic powder is treated with a suitable cations and examples of such cations are $Al^{3+}$, $Zn^{2+}$, $Th^{4+}$, $UO_2^{2+}$ and $Pd^{2+}$. However the use of aluminium salts are preferred in view of their cost and the size of the ion which is small. Preferably the surface charge modifying agent is an aluminium salt of a mineral acid such as aluminium sulphate or aluminium chloride but preferably the salt is aluminium nitrate. If desired the inorganic surface charge modifying agent can be replaced in part or supplemented by the use of an organic compound which is cationic in the particular dispersion. If desired the organic compound, itself, can be a polymerisable monomer but non-polymerisable cationic compounds can be used. Preferably the organic compound is a polyelectrolyte and suitable compounds are protein colloids, cationic guar gum, certain polymers of methacrylates, vinyl amine and vinyl pyridine. Methacrylic acid can be added to the powder dispersion, usually prior to the surface modifying agent as an adjunct, if desired.

The amount of the surface charge modifying agent need only be sufficient to achieve the desired cationic charge density and can be determined easily by electrophoretic or other means. Typical amounts of the surface charge modifying agent will be from 2.5% to 7.5% by weight, of, say, an aluminium salt, on weight of inorganic powder depending on the particular inorganic powder to be treated and on the desired cationic charge.

As described the process of the present invention polymerises an ethylenically unsaturated monomer to coat the inorganic powder particles with a polymer or copolymer as is desired. Any ethylenically unsaturated monomer which is polymerisable in an emulsion polymerisation system can be used in the present invention. Usually the polymer produced desirably is insoluble in water and, if necessary may be cross-linked by a suitable cross-linking agent. Typical ethylenically unsaturated monomers are aliphatic or aromatic compounds containing a polymerisable unsaturated group such as the unsaturated carboxylic acids or unsaturated carboxylic acid esters. One of the carbon atoms forming the double bond can preferably carry two hydrogen atoms and such compounds would be named vinyl monomers. Typical monomers useful are acidic monomers such as acrylic acid, methacrylic acid, itaconic acid, maleic acid or its anhydride, fumaric acid, crotonic acid. Esters of acid monomers can be used such as methyl acrylate, ethyl acrylate, methyl methacrylate, butyl acrylate and ethyl methacrylate. Other monomers which can be polymerised to form coatings are styrene, vinyl toluene, alpha methylstyrene, ethylene, vinyl acetate, vinyl chloride, acrylonitrile, and the like.

If desired two or more of the polymerisable monomers can be copolymerised. Also a cross-linking agent can be present and typical agents are di- or poly-functional ethylenically unsaturated monomers, for example ethylene glycol dimethacrylate, ethylene glycol diacrylate, allyl methacrylate, allyl acrylate, 1,3-butanediol diacrylate, divinyl benzene or 1,3-butanediol dimethacrylate. The amount of such cross-linking agent can be within the range of 10% to 50% by weight of said agent on weight of total monomer employed.

As described hereinbefore the amount of said polymerisable ethylenically unsaturated monomer is not greater than 200% by weight of the inorganic powder and preferably the amount is not greater than 100% by weight. In the most desirable process the amount of said polymerisable ethylenically unsaturated monomer is within the range 2% to 25% by weight of the inorganic powder.

The inorganic powder usually will be formed into an aqueous dispersion initially, if necessary, with the aid of a dispersing agent. This dispersion can be milled, if desired, and then to the dispersion there is added any necessary surface-modifying agent, followed by, or preceded by, any desired organic polyelectrolyte or other adjunct. When the adjunct is an organic acid such as methacrylic acid an amount of a cross-linking agent such as ethylene glycol dimethacrylate can also be added.

In the process of the invention the chosen monomer usually, prior to mixing with the inorganic powder, is formed into an aqueous emulsion employing, as is necessary, a nonionic or anionic emulsifier or a mixture thereof to assist the emulsification. Typical emulsifying agents are sodium dodecyl benzene sulphonate and ethoxylated alkyl phenols such as those in which the alkyl group is a nonyl, octyl or decyl group. Other known emulsifying agents can be employed.

Where the polymerisation is to be effected in the presence of a cross-linking agent for the chosen ethylenically unsaturated monomer or monomers then this usually but not always will be added to the inorganic powder separately from the emulsion of the monomer.

Usually the polymerisation is initiated with a water-soluble initiator such as a peroxy compound, a persulphate, a peracetate or a redox initiator, e.g. a salt of a persulphuric acid or an organic hydroperoxide or peroxide in combination with a sulphite, bisulphite, hydrosulphite or metal formaldehyde sulphoxylate. The initiator is added at any suitable stage, e.g. prior to the addition of the monomer to the inorganic powder. Only a part of the required amount of the initiator can be added initially followed by the remaining necessary amount or amounts at one or more later stages.

The polymerisation of the added monomers is usually carried out at an elevated temperature, and depending on the ambient temperature within the range 25° C. to 80° C., usually from 30° C. to 50° C. The polymerisation normally but not always is effected in an inert atmosphere, for example, under a protective tmosphere of an inert gas, e.g. nitrogen.

In the process of the present invention at least part of the polymerisation is effected while subjecting the mixture of the monomer and inorganic powder to the effect of ultrasonic vibrations. Usually this is achieved by immersing an ultrasonic vibrator in the aqueous mixture being polymerised and preferably the mixture is treated with the vibrations from the commencement of polymerisation. The ultrasonic vibrations are those known as power ultrasound usually employing frequencies in the range 20 to 50 kHz. The actual power delivered to the mixture depends on that desired and on the volume of mixture being treated and it has been found that most advantageous results are obtained by employing relatively low powers of ultrasonic vibrations. Preferably, the power output into the polymerisation mixture is within the range 15 to 60 watts per liter of mixture and most desirably 20 to 30 watts per liter. Typically the amount of inorganic powder in the mixture is within the range 150 to 300 gms per liter, preferably 200 to 240 grams per liter.

The use of lower amounts of power of the ultrasonic vibrations produces a more uniform coating insofar as the degree of coverage is concerned. Higher amounts of power provide a better dispersion of the particles of the inorganic powder. The use of lower concentrations of inorganic powder in the aqueous dispersion also improves the thickness and uniformity of the coating coverage.

The coated particles produced by the process of the invention can be used as opacifiers in paints and other media such as in plastics and inks. The coating provides an improvement of the dispersion of the inorganic material in organic media and also tends to reduce the abrasivity of the powder on manufacturing equipment for plastics containing the powders.

The invention is illustrated in the following Examples.

EXAMPLE 1

The general process for the production of coated inorganic powders is described in the following numbered stages during which an atmosphere of dry nitrogen was maintained in the reaction vessel.

Stage 1

Inorganic powder (190 g) was weighed into a 1 l. kettle and 750 ml of $N_2$ purged (30–60 mins, dry $N_2$) distilled water added. The slurry was mechanically stirred at 20° C. for 5–10 minutes.

Stage 2

Methacrylic acid (MA) (1.9 g) was added and stirring continued for 15 minutes at 20° C.

Stage 3

$Al(NO_3)_3$ (2.8 g) (AlN) was added and stirring continued for 10 minutes.

Stage 4

Ethylene glycol dimethacrylate (EDMA, 0.525 g) was added and the temperature raised to 40° C. (20–30 mins). Stirring was continued at 40° C. for 15 minutes.

Stage 5

Fresh solutions of 1% potassium persulphate (0.25 g/25 ml, solution A) and 1% sodium bisulphite (0.25 g/25 ml, solution B) were prepared. 1.8 g of solution A and 0.9 g of solution B were added to the kettle and stirring continued for 15 minutes.

Stage 6

Methyl methacrylate (MMA, 7.5 g) was emulsified in water (100 ml) with an emulsifying agent (EA) (0.38 g) using an ultrasonic probe (5 minutes). The emulsion was added (5 ml aliquots), with stirring, over a period of 15 minutes.

Stage 7

Ethylene glycol dimethacrylate (0.41 g) was added and the temperature raised to 70° C. (45–65 mins).

Stage 8

Further aliquots of solution A (7.2 g) and solution B (3.6 g) were added and the polymerisation left for 4 hours at 70° C.

Stage 9

After 4 hours the product was filtered, washed with water and dried overnight at 70° C.

The emulsifying agent was isooctylphenoxypolyethoxy ethanol and was available commercially under the Trade Name "Triton-X".

In carrying out specific experiments as detailed hereinafter ultrasound was applied to the reaction vessel employed in experiment 2 by an ultrasound bath (10–15/$cm^2$ watts) and for the remaining experiments by ultrasonic probes of different basic power outputs, one of a maximum rated output of 225 watts (probe X) and one of a maximum rated output of 375 watts (probe Y). The ultrasound was used according to three different schedules i.e.

Schedule
I-during stages 1 to 5 inclusive
E-during stages 1 to 7 inclusive
P-during stages 5 to 7 inclusive Twenty six experiments were carried out as described below with the conditions as shown in Table 1. The watts shown was the actual amount of power delivered to the reactants during operation of the probe. In Experiments 3 to 8, 11 to 18 and 21 to 26 the chosen probe was operated at 30% rated output and in the other experiments at 60% of rated output. The amount of reagents shown is that given in the general description (i.e. 1=same; ½=½ of the general description etc.)

EXAMPLE 2

The general process as detailed in Example 1 was repeated with certain variations as detailed in the description of the Experiments described below. The probe was probe Y and the power was supplied at an input of 22 watts during stages 1 to 5 inclusive unless specified otherwise. The powder used was the same titanium dioxide as in Experiments 3 to 26.

Experiment 27

In stage 2 acrylic acid (1.9 g) was added instead of the methacrylic acid. The product was polymer coated titanium dioxide.

Experiment 28

Three different amounts of the emulsifying agent

TABLE 1

| EXP | ULTRASOUND PROBE/WATTS/ DURATION | POWDER | MA | AIN | EDMA | EA | MMA |
|---|---|---|---|---|---|---|---|
| 1 | NONE | 1 Ba$_2$SO$_4$ | 1 | 1 | 1 | 1 | 1 |
| 2 | BATH/WATTS/E | 1 Ba$_2$SO$_4$ | 1 | 1 | 1 | 1 | 1 |
| 3 | Y/47/P | 1 TiO$_2$ | 1 | 1 | 1 | 1 | 1 |
| 4 | X/28/P | 1 TiO$_2$ | 1 | 1 | 1 | 1 | 1 |
| 5 | Y/47/E | 1 TiO$_2$ | 1 | 1 | 1 | 1 | 1 |
| 6 | X/28/E | 1 TiO$_2$ | 1 | 1 | 1 | 1 | 1 |
| 7 | X/28/I | 1 TiO$_2$ | 1 | 1 | 1 | 1 | 1 |
| 8 | Y/47/I | 1 TiO$_2$ | 1 | 1 | 1 | 1 | 1 |
| 9 | X/55/E | 1 TiO$_2$ | 1 | 1 | 1 | 1 | 1 |
| 10 | Y/41/E | 1 TiO$_2$ | 1 | 1 | 1 | 1 | 1 |
| 11 | Y/22/E | 1 TiO$_2$ | 1 | 1 | 1 | ½ | 1 |
| 12 | X/28/E | 1 TiO$_2$ | 1 | 1 | 1 | ½ | 1 |
| 13 | Y/22/I | ½ TiO$_2$ | ½ | ½ | ½ | ½ | ½ |
| 14 | X/28/I | ½ TiO$_2$ | ½ | ½ | ½ | ½ | ½ |
| 15 | Y/22/I | ½ TiO$_2$ | 1 | 1 | 1 | ½ | 1 |
| 16 | X/28/I | ½ TiO$_2$ | 1 | 1 | 1 | ½ | 1 |
| 17 | Y/22/I | 1 TiO$_2$ | 1 | 1 | 1 | 1 | 1 |
| 18 | X/28/I | 1 TiO$_2$ | 1 | 1 | 1 | 1 | 1 |
| 19 | Y/41/I | ½ TiO$_2$ | 1 | 1 | 1 | ½ | 1 |
| 20 | X/55/I | ½ TiO$_2$ | 1 | 1 | 1 | ½ | 1 |
| 21 | Y/22/I | 1 TiO$_2$ | 2 | 2 | 2 | 1 | 2 |
| 22 | X/28/I | 1 TiO$_2$ | 2 | 2 | 2 | 1 | 2 |
| 23 | Y/22/I | 1 TiO$_2$ | 1 | 1 | 1 | 1 | 2 |
| 24 | X/28/I | 1 TiO$_2$ | 1 | 1 | 1 | 1 | 2 |
| 25 | Y/22/I | 1 TiO$_2$ | 2 | 1 | 1(DVB) | ½ | 1 |
| 26 | X/28/I | 1 TiO$_2$ | 2 | 1 | 1(DVB) | ½ | 1 |

DVB = divinyl benzene instead of EDMA

The products obtained were examined by electron microscopy and micrographs visually assessed. Generally speaking the examination showed that the use of ultrasound improved the degree of coverage of the product of experiment 2 as compared with experiment 1.

It was seen that the most beneficial effect was obtained when ultrasound was used only in the initial stage of the reaction i.e. I was better than P which was better than E.

Also the use of lower power levels improved the coverage as compared to higher power but higher power levels produced better dispersion of the coated particles.

An increase in the ratio of emulsifying agent/powder improved the coverage. A decrease in the content of TiO$_2$ slightly improved the thickness and uniformity of the coating. Also increasing the monomer concentration increased the coverage and uniformity of the coating.

In the experiments the titanium dioxide used was the reactor discharge obtained in the vapour phase oxidation of titanium tetrachloride.

(EA) were employed equivalent to 5%, 3% and 12% by weight of monomer.

All produced similar degrees of coating on the powder but the optimum level was about 10% by weight of monomer.

Experiment 29

Butyl acrylate was used instead of methyl methacrylate. The powder was coated with polymer.

Experiment 30

Styrene was used in place of methyl methacrylate. The product had a uniform coating of polymer.

Experiment 31

A mixture of equal weights of methyl methacrylate and butyl acrylate was used instead of methyl methacrylate alone. The product was uniformly coated with polymer.

Experiment 32

Methyl methacrylate was replaced by butyl methacrylate. An encapsulated product was obtained.

Experiment 33

The emulsifying agent (EA) used was sodium dodecyl benzene sulphonate. A coated product was obtained but the coating was not as thick as that obtained using the emulsifying agent used in Experiments 1 to 24.

Experiment 34

Cetyl trimethyl ammonium bromide was used as the emulsifying agent. A product similar to that of Experiment 33 was obtained.

Experiment 35

The emulsifying agent used was sodium dodecyl benzene sulphonate and butyl acrylate was used instead of methyl methacrylate. A uniformly coated product was obtained.

Experiment 36

Amounts of methyl methacrylate were chosen to be equivalent to 1%, 3%, 5%, 7%, 9%, 11%, 13%, 15%, 17%, 19%, 21%, 23% and 25% of polymer on powder weight. All produced coated products.

Experiment 37

Amounts of potassium persulphate of 1%, 2%, 3%, 4%, 5%, 6% and 6.5% on weight of powder were used and amounts of sodium metabisulphate of 1%, 2%, 3% and 3.25% on powder were used in stages 5 and 8. All produced polymer coated products with an optimum coating being obtained using potassium persulphate in amounts of 1.44% and 6.5% in stages 5 and 8 respectively and sodium metabisulphite in amounts of 0.72% and 3.25% in stages 5 and 8 respectively.

Experiment 38

A mixture of 2 parts by weight styrene and one part by weight of methyl methacrylate was used instead of methyl methacrylate. The product was polymer coated powder.

Experiment 39

The sonic vibrations were applied throughout all the reaction stages but in a pulsed manner (at approximately 30 second intervals) instead of in a continuous manner. Again a polymer coated product was obtained.

Experiment 40

The process of Example 1 was carried out except that the power input in stage 1 was 50 watts. A polymer coated powder was produced.

In Experiments 27 to 40 where a reactant (or mixture) replaced another reactant described in Example 1 then unless specified otherwise an equal weight of the replacement was used.

All products were analysed visually by transmission electron micrographs.

We claim:

1. A process for the treatment of an inorganic powder which comprises polymerising a reaction mixture of an ethylenically unsaturated monomer in the presence of a dispersed inorganic powder having a cationic charge on the surface of the particles thereof, said monomer being present in an amount not greater than 200% of the weight of said powder, and subjecting the said monomer and said powder to the effect of ultrasonic vibrations during at least a part of the polymerisation of said monomer so that said particles are coated with polymerised monomer.

2. A process according to claim 1 in which the amount of the said monomer is not greater than 100% by weight of said powder.

3. A process according to claim 1 in which the amount of said monomer is from 2% to 25% by weight of said powder.

4. A process according to claim 1 in which the ultrasonic vibrations have a frequency of from 20 to 50 kHz.

5. A process according to claim 1 in which the power supplied into the reaction mixture by the ultrasonic vibrations is from 15 to 60 watts per liter.

6. A process according to claim 1 in which the inorganic powder is titanium dioxide.

7. A process according to claim 1 in which said inorganic powder is present in the form of an aqueous dispersion.

8. A process according to claim 7 in which the amount of the inorganic powder is from 150 to 300 gms per liter.

9. A process according to claim 1 in which the inorganic powder is treated with a surface charge modifying agent.

10. A process according to claim 9 in which the surface charge modifying agent is a source of a $Al^{3+}$, $Zn^{2+}$, $Th^{4+}$, $UO_2^{2+}$ or $Pd^{2+}$ ions.

11. A process according to claim 10 in which the surface charge modifying agent is an aluminium salt of a mineral acid.

12. A process according to claim 9 in which the amount of the surface modifying agent is from 2.5% to 7.5% by weight of the weight of said inorganic powder.

13. A process according to claim 9 in which a cationic organic compound is used as a surface charge modifiying agent.

14. A process according to claim 1 in which the said monomer is an unsaturated carboxylic acid or an ester thereof.

15. A process according to claim 14 in which two or more monomers are copolymerised.

16. A process according to claim 1 in which said monomer is selected from the class consisting of acrylic acid, methacrylic acid, itaconic acid, maleic acid, maleic anhydride, fumaric acid, crotonic acid, methyl acrylate, ethyl acrylate, methyl methacrylate, butyl acrylate, ethyl methacrylate, styrene, vinyl toluene, alpha methylstyrene, ethylene, vinyl acetate, vinyl chloride and acrylonitrile.

17. A process according to claim 1 in which said reaction mixture contains a cross-linking agent for polymerised monomer.

18. A process according to claim 17 in which the cross-linking agent is selected from the class consisting of ethylene glycol dimethacrylate, ethylene glycol diacrylate, allyl methacrylate, allyl acrylate, 1,3-butanediol diacrylate, divinyl benzene and 1,3 butanediol dimethacrylate.

19. A process according to claim 17 in which the amount of the cross-linking agent is from 10% to 50% of the total weight of the monomers to be polymerised.

20. A process according to claim 1 in which the said monomer is formed into an emulsion prior to mixing with said inorganic powder.

21. A process according to claim 1 in which the polymerisation is initiated with a water-soluble initiator.

22. A process according to claim 21 in which the initiator is a mixture of a persulphate and a metabisulphite.

* * * * *